United States Patent [19]

Davis et al.

[11] Patent Number: 5,490,726
[45] Date of Patent: Feb. 13, 1996

[54] APPARATUS FOR PROPORTIONING TWO COMPONENTS TO FORM A MIXTURE

[75] Inventors: Dennis Davis, Bay Village; Harold D. Beam, Oberlin; Jeffrey J. Kruke, Lorain, all of Ohio

[73] Assignee: Nordson Corporation, Westlake, Ohio

[21] Appl. No.: 999,284

[22] Filed: Dec. 30, 1992

[51] Int. Cl.$^6$ .............................. G05D 11/02; B01F 15/04
[52] U.S. Cl. ..................... 366/152.1; 366/162.1; 366/182.4; 366/339; 137/100; 137/101.21; 222/57
[58] Field of Search ..................... 366/142, 151, 366/152, 160, 162, 182, 338, 339, 340, 152.1, 162.1, 182.4; 222/57, 59, 135, 1; 137/100, 101.21, 114

[56] References Cited

U.S. PATENT DOCUMENTS

| | | |
|---|---|---|
| 1,483,225 | 2/1924 | Hammett . |
| 1,511,765 | 10/1924 | Latham . |
| 1,585,255 | 5/1926 | McFadden . |
| 1,626,487 | 4/1927 | Warren ................................. 366/339 X |
| 2,527,136 | 10/1950 | Kagi et al. ......................... 137/101.21 |
| 3,038,486 | 6/1962 | Thurman ........................ 137/101.21 X |
| 3,062,512 | 11/1962 | Carter ..................................... 366/162 |
| 3,229,077 | 1/1966 | Gross . |
| 3,429,480 | 2/1969 | Petyt . |
| 3,651,989 | 3/1972 | Westrich . |
| 3,709,468 | 1/1973 | Ives ........................................ 366/339 |
| 3,751,644 | 8/1973 | Mayer . |
| 3,762,428 | 10/1973 | Beck et al. . |
| 3,764,069 | 10/1973 | Runstadler, Jr. et al. . |
| 3,770,198 | 11/1973 | Mihara ................................ 137/100 X |
| 3,777,935 | 12/1973 | Storey . |
| 3,921,901 | 11/1975 | Woodman . |
| 3,967,634 | 7/1976 | Scherer et al. . |
| 4,019,653 | 4/1977 | Scherer et al. . |
| 4,046,287 | 9/1977 | Hoekstra et al. . |
| 4,059,466 | 11/1977 | Scholl et al. . |
| 4,059,714 | 11/1977 | Scholl et al. . |
| 4,116,364 | 9/1978 | Culbertson et al. . |
| 4,156,754 | 5/1979 | Cobbs, Jr. et al. . |
| 4,183,384 | 1/1980 | Ervin et al. ............................ 222/59 X |
| 4,193,745 | 3/1980 | Hamilton et al. . |
| 4,200,207 | 4/1980 | Akers et al. . |
| 4,234,007 | 11/1980 | Titone et al. . |
| 4,247,581 | 1/1981 | Cobbs, Jr. et al. . |
| 4,250,908 | 2/1981 | Velie . |
| 4,259,402 | 3/1981 | Cobbs, Jr. et al. . |
| 4,265,858 | 5/1981 | Crum et al. . |
| 4,288,741 | 9/1981 | Dechene et al. . |
| 4,301,119 | 11/1981 | Cobbs, Jr. et al. . |
| 4,350,266 | 9/1982 | Hetherington et al. . |
| 4,371,096 | 2/1983 | Scholl et al. . |

(List continued on next page.)

FOREIGN PATENT DOCUMENTS

| | | |
|---|---|---|
| 0246797 | 11/1987 | European Pat. Off. . |
| 0259689 | 3/1988 | European Pat. Off. . |
| 300902 | 1/1989 | European Pat. Off. . |
| 0321607 | 6/1989 | European Pat. Off. . |
| 0350910 | 1/1990 | European Pat. Off. . |
| 0350909 | 1/1990 | European Pat. Off. . |
| 0388927 | 3/1990 | European Pat. Off. . |
| 0388923 | 9/1990 | European Pat. Off. . |
| 0388916 | 9/1990 | European Pat. Off. . |
| 0388915 | 9/1990 | European Pat. Off. . |
| 428873 | 5/1991 | European Pat. Off. . |
| 2753905 | 6/1979 | Germany . |
| 61-146329 | 7/1986 | Japan ..................................... 366/152 |
| 2026729 | 2/1980 | United Kingdom . |

Primary Examiner—Charles E. Cooley
Attorney, Agent, or Firm—Holland & Knight

[57] ABSTRACT

A method and apparatus is provided for combining two components to form a coating material formulation in which one of the components is a "high volume" component comprising a resin including supercritical fluid as a diluent, and the other of the components is a "low volume" component, such as a catalyst. The relative ratio of resin to catalyst is controlled by adjusting the catalyst pressure as a function of the pressure at which the resin is supplied to ,one or more coating dispensers and by adjusting the duty cycle of a catalyst valve within the catalyst flow path.

6 Claims, 3 Drawing Sheets

U.S. PATENT DOCUMENTS

| | | | |
|---|---|---|---|
| 4,405,063 | 9/1983 | Wydro et al. | |
| 4,423,161 | 12/1983 | Cobbs, Jr. et al. | |
| 4,433,701 | 2/1984 | Cox et al. | 366/152 X |
| 4,483,463 | 11/1984 | Buschmann | |
| 4,487,333 | 12/1984 | Pounder et al. | 222/54 |
| 4,505,405 | 3/1985 | Kelly et al. | |
| 4,505,406 | 3/1985 | Cobbs, Jr. et al. | |
| 4,505,957 | 3/1985 | Cobbs, Jr. et al. | |
| 4,516,725 | 5/1985 | Cavanaugh et al. | |
| 4,522,789 | 6/1985 | Kelly et al. | |
| 4,527,712 | 7/1985 | Cobbs, Jr. et al. | |
| 4,553,701 | 11/1985 | Rehman et al. | |
| 4,601,645 | 7/1986 | Schmitkons | |
| 4,630,774 | 12/1986 | Rehman et al. | |
| 4,632,314 | 12/1986 | Smith et al. | |
| 4,654,802 | 3/1987 | Davis | |
| 4,705,461 | 11/1987 | Clements | |
| 4,717,582 | 1/1988 | Kotoye et al. | |
| 4,734,451 | 3/1988 | Smith | |
| 4,778,631 | 10/1988 | Cobbs, Jr. et al. | |
| 4,779,762 | 10/1988 | Klein et al. | |
| 4,882,107 | 11/1989 | Cavender et al. | |
| 4,953,403 | 9/1990 | Springer | 73/198 |
| 5,027,742 | 7/1991 | Lee et al. | |
| 5,057,342 | 10/1991 | Hoy et al. | |
| 5,088,443 | 2/1992 | Hastings et al. | |
| 5,098,194 | 3/1992 | Kuo et al. | |
| 5,106,659 | 4/1992 | Hastings et al. | |
| 5,225,239 | 7/1993 | Ostin | |

APPARATUS FOR PROPORTIONING TWO COMPONENTS TO FORM A MIXTURE

RELATED APPLICATIONS

This application relates to U.S. patent application Ser. No. 07/998,584, now U.S. Pat. No. 5,407,267 entitled "Method and Apparatus for Forming and Dispensing Coating Material Containing Multiple Components" to Davis, filed on the same date as this application, which is owned by the assignee of this invention.

FIELD OF THE INVENTION

This invention relates to coating systems, and, more particularly, to a method and apparatus for combining a first component with a second component in high ratios, and wherein at least one of the two components is supplied at a low flow rate.

BACKGROUND OF THE INVENTION

In recent years, substantial efforts have been expended in the coating and finishing industry to reduce the organic solvent content of coating materials such as paint in order to avoid adverse environmental effects created by the solvents. Even high solids coating compositions, having a solids content of up to 60% by volume, include liquid solvent components which can escape during handling, atomization or deposition substrate and creating environmental and health hazards.

This problem has been addressed in U.S. Pat. Nos. 4,923,720; 5,106,659 and U.S. Pat. No. 5,215,253 entitled "Method and Apparatus for Forming and Dispensing Single and Multiple Phase Coating Material Containing Fluid Diluent," to Saidman et al., filed Jul. 15, 1991 which is owned by the assignee of this invention. These patents disclose coating material solutions or formulations in which the liquid solvent component is replaced to a large extent with a supercritical fluid, such as supercritical carbon dioxide, which functions as a diluent to enhance the application properties of the coating material formulation. The supercritical carbon dioxide and some liquid solvent material, e.g. about ⅔ less than is required in other coating compositions, are intermixed with polymeric pigmentary solids to form a coating material solution or formulation having a viscosity which facilitates atomization through an airless coating dispenser. As the coating material formulation is discharged from the dispensing devices toward a substrate, the supercritical carbon dioxide "flashes off" or vaporizes to assist in atomization of the high solids coating composition and to reduce drying time of the composition on the substrate. This type of coating material formulation has the advantage of substantially reducing the adverse environmental effects caused by coating compositions having a high solvent compound.

A variety of resins, e.g. paints, can be formulated in the above described manner to reduce their solvent content, and the type of paint employed depends upon the requirements of a particular application. In certain applications, such as, for example, when rapid drying time is advantageous, "two component" paints are desirable. Two component paints formulated in accordance with the teachings of the patent mentioned above include a "high volume component" consisting of polymeric pigmentary solids, supercritical fluid and some organic solvents, and a "low volume component" such as a catalyst.

Conventionally, two component paints are formed by directing each of the components through a separate metering device, such as a metering gear pump, and then intermixing them within a static or dynamic mixer prior to discharge onto a substrate. These types of mixing systems are suitable for certain ratios and flow rates of the two components, but generally do not provide the desired accuracy at ratios greater than about 20 to 1 (high volume component to low volume component) and/or at flow rates of the low volume component less than about 20 ccm/min. Nevertheless, some two-component paints, including certain two-component coating material formulations including supercritical fluid, require a resin to catalyst ratio on the order of up to 100 to 1, and a flow rate of the low volume component or catalyst as small as 3 ccm/min. Currently available devices for intermixing such types of two component paints, at the required ratio and catalyst flow volume, are not available.

SUMMARY OF THE INVENTION

It is therefore among the objectives of this invention to provide a method and apparatus for intermixing two component coating material formulations, one component of which includes supercritical fluid as a diluent, which provides for accurate control and metering of each component at relatively high ratios, e.g. in excess of 20 to 1, which provides for accurate and immediate control at low volume flow of one component, which is sensitive to fluctuations in pressure and flow requirements, and which is relatively inexpensive to fabricate and operate.

These objectives are accomplished in a method and apparatus for combining two components to form a coating material formulation in which one of the components is a "high volume." component comprising a resin including supercritical fluid as a diluent, and the other of the components is a "low volume" component such as a catalyst. The resin and catalyst are transmitted through separate, but functionally related, flow paths to a mixer within which they are combined to form a coating material formulation which is then discharged by one or more coating dispenser or spray guns onto a substrate.

Certain types of two-component coating material formulations containing supercritical fluid as a diluent require relatively high ratios of resin-to-catalyst, and low catalyst flow rates. One aspect of this invention is predicated upon the provision of a control system which accurately controls proportionate amounts of resin-to-catalyst in ratios on the order of up to about 100 to 1, and which can accurately control flow rates of catalyst as low as 3 ccm/min. One control function performed by the method and apparatus of this invention to achieve such ratio and flow rate control involves adjusting the duty cycle or "valve on" time of a catalyst valve, located within the catalyst flow path, with an analog controller operatively connected to both the resin and catalyst flow paths. As described in detail below, an initial set-up or calibration operation is performed to account for the flow properties of a particular catalyst to be dispensed by the system, and to account for the inherent delay caused by physical movement of the valve after it receives a signal to open and permit the flow of catalyst therethrough. This calibration procedure results in the determination of a system offset or delay value which is input to the analog controller. The analog controller, in turn, operates the catalyst value to obtain an essentially straightline relationship between catalyst valve on time and resin flow rate during operation of not only one coating dispenser, but multiple coating dispensers, as required for a particular application.

Once the calibration procedure is completed and operation begins, the analog controller is effective to provide essentially two control functions governing the operation of the catalyst valve, both of which are dependent on the flow of resin through its flow meter. One function is an essentially immediate response to activation of one or more coating dispensers. When spraying is initiated through one or more dispensers, resin is transmitted through the flow meter in the resin flow path to supply such dispenser(s). A signal from the resin flow meter representative of the resin flow is transmitted to the analog controller which virtually immediately produces a signal to open the catalyst valve and supply the desired proportionate volume of catalyst to the mixer for combination with the resin. As a result, extremely fast and accurate control of catalyst flow is obtained which is directly dependent and proportionate to the resin flow.

The analog controller also provides for periodic adjustment of the duty cycle of the catalyst valve during operation of the system dependent on a comparison between the actual flow rates of resin and catalyst, and a predetermined, desired ratio of such flow rates. In the presently preferred embodiment, signals are obtained from both the resin and catalyst flow meters which are representative of actual flows of resin and catalyst through their respective flow paths. The ratio of such actual flow rates is compared to a predetermined, desired ratio within a ratio comparator at selected time intervals, e.g. on the order of about ten seconds. The ratio comparator is effective to produce an output or error signal representative of the difference between the desired and actual ratios. Circuitry within the analog controller processes this error signal, in a manner described below, and produces a signal which is input to a valve driver circuit connected to the catalyst valve, e.g. a solenoid valve. The valve driver circuit is effective to control the duty cycle of the solenoid valve such that the flow rate of catalyst to the mixer is adjusted in accordance with any variation between the actual ratio of resin-to-catalyst and the desired ratio.

As described above, the flow of catalyst "tracks" i.e. is directly proportionate to, the flow of resin to the mixer. This provides a very fast and accurate adjustment of the relative proportion of the two components. Another aspect of this invention is predicated on the concept of providing further adjustment or correction in the relative ratio of resin-to-catalyst by adjusting the catalyst pressure so that it also "tracks," i.e. is directly responsive to, the pressure at which the high volume component or resin is supplied to the spray guns. In response to the demand for coating material formulation, such as by activating one or more spray guns, a required amount of resin is dispensed through a flow meter at a predetermined pressure to the mixer. A tap line connected to the resin flow line senses the pressure at which the resin is delivered to the mixer and a fluid signal representative of this pressure is transmitted to a differential pressure regulator connected in the flow path of the catalyst. Catalyst is emitted from the differential pressure regulator at a pressure directly proportionate to the pressure of the resin, and the catalyst then flows through a flow meter to a manually, pneumatically or electrically operated catalyst valve immediately upstream from the mixer. With this arrangement, the pressure within the catalyst flow path between the pressure regulator and the mixer is therefore dependent upon the pressure of the resin. Moreover, fluctuations in the resin pressure, caused by pump strokes, and/or operating different numbers of spray guns and/or turning them on or off at random, are immediately "tracked" within the catalyst flow path via the connection through the differential pressure regulator to the flow line carrying the resin. As a result, more accurate and immediate adjustment and control of the resin-to-catalyst ratio is obtained, even at low volume catalyst flow rates.

In a further aspect of this invention, the mixer herein is constructed to provide at least a limited degree of "catch up" or flow rate differential between the resin and catalyst flowing therethrough so that the resin is assured of being brought into contact with catalyst before being discharged to the spray guns. Preferably, the mixer of this invention comprises a tube having an interior formed with an inlet connected to both the resin and catalyst flow paths, and an outlet connected to one or more coating dispensers or spray guns. A rod is insertable within the interior of the tube, between its inlet and outlet, including an outer surface formed with one set of screw threads having a first pitch and a second set of screw threads having a second pitch different from the first. These first and second sets of screw threads form channels along the outer surface of the rod which define flow paths of different length, measured in a direction from the inlet toward the outlet of the mixer tube. As a result, the catalyst is allowed to "catch up" or contact and intermix with any resin which may have entered the mixer either before or after the catalyst entered therein. This ensures that all of the resin emitted from the mixer has been exposed to catalyst prior to introduction into the coating dispensers.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
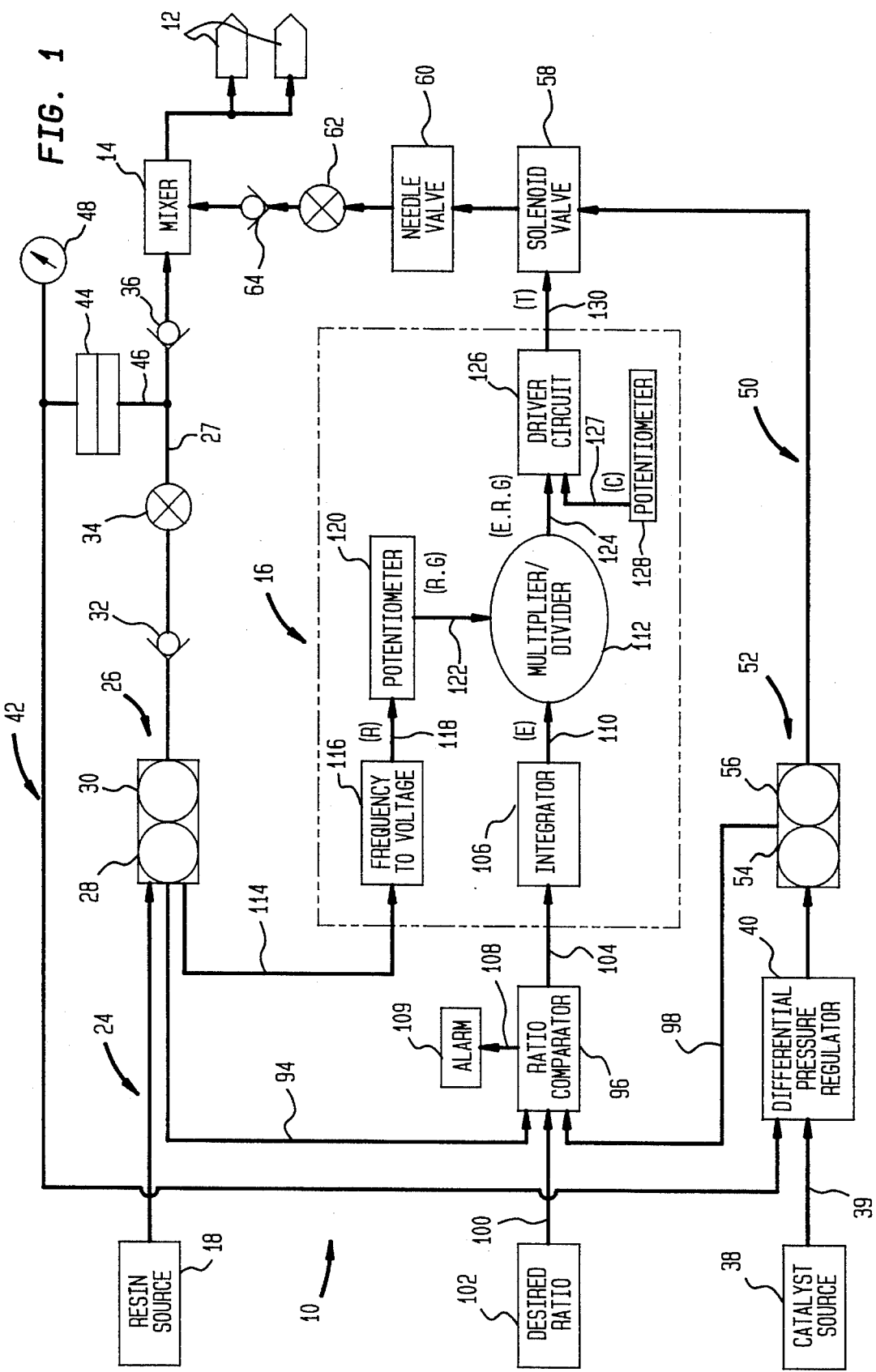
FIG. 1 is a schematic block diagram of the preferred embodiment of the apparatus of this invention.

The method and apparatus 10 of this invention is specifically intended to intermix a liquid coating composition or resin containing supercritical fluid as a diluent, with a catalyst, to form a coating material solution or formulation which is transmitted to one or more coating dispensers 12 for deposition onto a substrate (not shown). For purposes of the present discussion, the term "liquid coating composition" refers to a resin material such as paint which includes one or more components to be sprayed, applied or dispersed and a solvent component, wherein a portion of the solvent component has been replaced with a fluid diluent such as supercritical fluid to reduce solvent emissions. The term "supercritical fluid" as used herein is intended to refer to a gas in a supercritical state above its critical pressure and critical temperature wherein the gas has density approaching that of a liquid material. It is also contemplated that liquified gases could be utilized in forming the resin, and therefore the term "liquified gas" may be substituted for "supercritical fluid" in the following description. The term "fluid diluent" as used herein is meant to refer interchangeably to supercritical fluids and liquified gases. The terms "coating material solution" and/or "coating material formulation" are used synonymously to refer to the mixture of a resin containing supercritical fluid and a catalyst, wherein the fluid diluent is substantially dissolved in the resin to form a solution or at least an emulsion or dispersion.

A "coating dispenser" as used herein will normally be an airless-type spray gun capable of handling the fluid pressure utilized in the apparatus 10. Preferably, the dispensers are airless-type spray guns of the type disclosed in U.S. Pat. No. 5,106,659 to Hastings et al., which is owned by the assignee of this invention and which is hereby incorporated by reference in its entirety herein. Alternatively, air-assisted airless-type spray guns can be used such as are shown in U.S. Pat. No. 3,843,052 to Cowan.

The purpose of the supercritical fluid and/or liquified gas is to act as a fluid diluent for the coating composition so that the proportion or percentage of organic solvents in the liquid coating composition can be reduced, e.g. by about two-thirds, compared, for example, to most commercially available high solids liquid coating compositions such as paint. A number of compounds in a supercritical or liquified state can be intermixed with a liquid coating composition such as paint or resin to produce the coating material solution or formulation when mixed with catalysts as described below. These compounds include carbon dioxide, ammonia, water, nitrogen oxide ($N_2O$), methane, ethane, ethylene, propane, pentane, methanol, ethanol, isopropanol, isobutanol, chlorotrifluoromethane, monofluoromethane and others. For purposes of the present discussion, supercritical carbon dioxide is employed because of its nontoxic nature and because its critical temperature and critical pressure of 85° F. and 1070 psi, respectively, are well within the operating ranges of standard airless spraying systems including the apparatus 10 of this invention.

The overall construction of the apparatus 10 is first discussed below, followed by description of its operation including an initial calibration procedure.

SYSTEM CONSTRUCTION

With reference to FIG. 1, the top portion of the drawing depicts a resin flow path to a mixer 14, the bottom portion of the drawing illustrates a catalyst flow path, and, the center portion of FIG. 1 depicts circuitry including an analog controller 16 shown in dotted lines which controls the flow of catalyst to the mixer 14 in a manner described in detail below. Considering first the resin flow path, the box entitled "Resin Source" which is labelled with reference number 18 refers to the system disclosed in U.S. Pat. No. 5,215,253 to Saidman et al. entitled "Dispensing Single and Multiple Phase Coating Material Containing Fluid Diluent," which is owned by the assignee of this invention, and the disclosure of which is incorporated by reference in its entirety herein. The resin source 18 is effective to produce a mixture of a liquid coating composition and supercritical fluid as a diluent which, for ease of discussion, is referred to herein as "resin." As noted above, resins of the type formulated in accordance with the teachings of U.S. Pat. No. 5,215,253 employ supercritical fluid, such as supercritical carbon dioxide, as a replacement for on the order of about two-thirds of the organic solvent content of conventional high solids paint.

Resin from the source 18 is directed through a resin supply line 24 into a flow meter 26 preferably of the type having intermeshing sets of gear teeth 28 and 30 as depicted schematically in FIG. 1. A suitable flow meter 26 is commercially available from the AW Company of Racine, Wisc. under Model No. ZHM 02/1. A metered quantity of resin is emitted from flow meter 26 into feed line 27 where it passes through a first check valve 32, a resin shut-off valve 34 and a second check valve 36 to the mixer 14. The purpose of the check valves 32, 36 is to prevent any back flow of resin downstream from the mixer 14 toward the flow meter 26. The resin shut-off valve 34 is provided to stop the flow of resin to the mixer 14, if necessary, such as when operation of the apparatus 10 is shut down for any purpose.

As noted above, the catalyst flow path is depicted at the bottom of FIG. 1. It includes a catalyst source 38, shown schematically as a block in FIG. 1, which is intended to represent a tank and pump (not shown) for delivering catalyst, under pressure, through line 39 to a differential pressure regulator 40. This differential pressure regulator 40 is connected by a transfer line 42 to a diaphragm seal 44, which, in turn, is connected by a tap line 46 to the resin feed line 27. See top of FIG. 1. The resin, under pressure, enters the diaphragm seal 44 through tap line 46. The diaphragm seal 44 produces an "output signal" i.e. a pressurized flow of liquid through transfer line 42 to differential pressure regulator 40, which is representative of the pressure of the resin within resin supply line 24. Such pressure level can be visually monitored by a pressure gauge 48 connected along transfer line 42.

The differential pressure regulator 40 is effective to discharge catalyst into a catalyst supply line 50 at a pressure which is directly proportional to but greater than the resin pressure; i.e. by about 100 to 300 psi. The relative proportion or ratio between resin pressure and catalyst pressure is set within the differential pressure regulator 40, and is dependent upon such factors as the fluid properties of the resin and catalyst, the desired volumetric ratio of resin-to-catalyst and the flow rate of catalyst required for combination with the resin. A differential pressure regulator 40 suitable for this purpose is manufactured by Tescom of Elk River, Minn. under Model No. 54-2000.

The pressurized catalyst emitted from differential pressure regulator 40 into supply line 50 is transmitted to a catalyst flow meter 52 which, in the illustrated embodiment, includes two sets of intermeshing gears 54 and 56 which emit a metered quantity of catalyst into the catalyst supply line 50 downstream therefrom. One type of flow meter suitable for use is commercially available from the AW Company of Racine, Wisc. under Model No. ZHM 01. Although a gear meter type flow meter 52 is illustrated in FIG. 1, it is contemplated that other types of flow metering devices could be employed within the catalyst flow path.

The metered flow of catalyst emitted from flow meter 52 is transmitted through supply line 50 to a solenoid valve 58 and then into a needle valve 60. The operation of valves 58 and 60 is described in detail below in connection with a discussion of the operation of apparatus 10. Preferably, the solenoid valve 58 is of the type sold by Nordson Corporation of Westlake, Ohio under Model No. A-10-A, and a Model No. SS2-A valve manufactured by Nupro Swagelock Company of Willouby, Ohio is a suitable type of needle valve. From the needle valve 60, the catalyst flows through a catalyst shut-off valve 62 and a third check valve 64 to the mixer 14 where it is intermixed with the resin to form a coating material formulation. The purpose of check valve 64 is to prevent any back flow of catalyst in a downstream direction toward the needle valve 60, and the shut-off valve 62 is included to provide a complete discontinuance of catalyst flow to the mixer 14.

MIXER CONSTRUCTION

Figure 2:
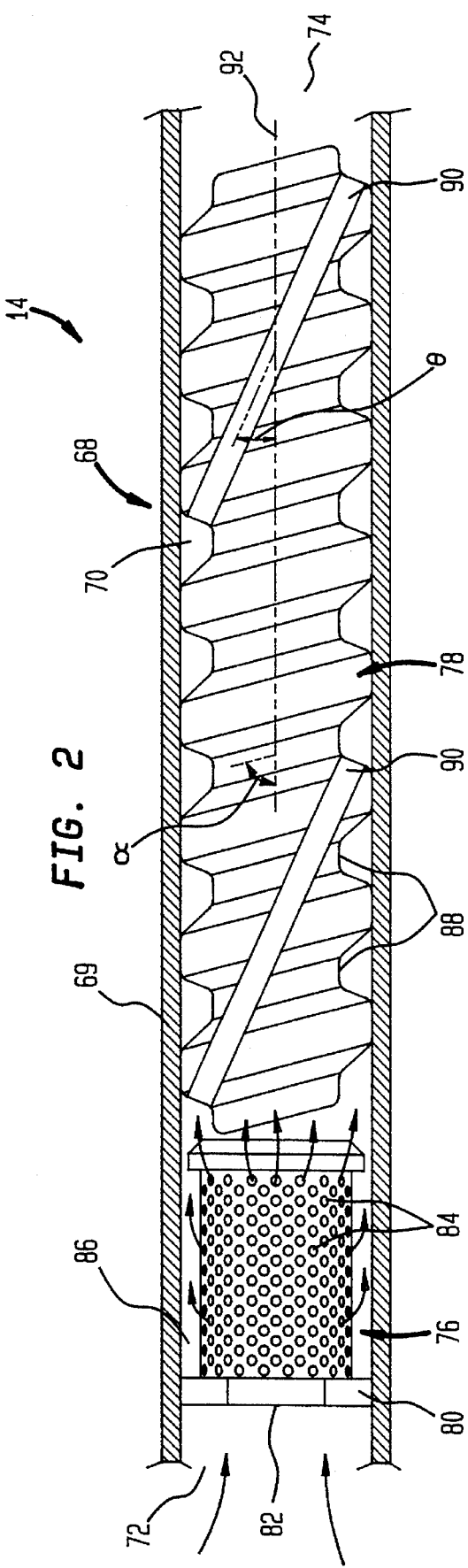
FIG. 2 is a cross-sectional view of the mixer of FIG. 1.

Referring now to FIG. 2, the mixer 14 is illustrated in detail. Mixer 14 includes a mixer tube 68 having a wall 69 defining an interior 70 including an inlet end 72 and an outlet end 74. The mixer tube interior 70 receives two elements, namely, a premix screen 76 and a mixer rod 78 located downstream from the premix screen 76. The premix screen 76 is cylindrical in shape having an annular flange 80 at one end which contacts the tube wall 69, a central throughbore 82 and a plurality of screen openings 84 extending radially outwardly from the central throughbore 82. As depicted by the arrows in FIG. 2, the catalyst and resin are introduced into the inlet end 72 of mixer tube 68 and flow into the central throughbore 82 of premix screen 76. A portion of the resin and catalyst flows along the central throughbore 82, and the remainder moves radially outwardly therefrom through the screen openings 84 into an annular space or gap 86 between the exterior surface of premix screen 76 and the tube wall 69 of mixer tube 68.

As mentioned above, the mixer rod 78 is located downstream from premix screen 76 within the mixer tube interior 70. In the presently preferred embodiment, the exterior surface of mixer rod 78 is formed with a first set of threads or channels 88 and a second set of threads or channels 90, both of which extend in the longitudinal direction of the mixer rod 78. The channels 88 are pitched at an angle $\alpha$ on the order of about 75° relative to the longitudinal axis 92 of mixer rod 78, whereas the channels 90 are pitched at an angle $\theta$ of approximately 50° with respect to the longitudinal axis 92. As a result, a shorter flow path is provided by channels 90, compared to channels 88, measured along the longitudinal extent of mixer rod 78. This is because resin, catalyst and/or a mixture thereof must flow along the steeper angled channels 88, and thus make less progress axially along the length of mixer tube 68 over a given time period, than liquid flowing along the lesser angled channels 90. One purpose of the different pitches of channels 88 and 90 is to provide an opportunity for the catalyst and/or resin to "catch up" with one another, i.e. move more quickly along the axial length of mixer tube 68, so that in the event the resin has been introduced into the mixer 14 either before or after the catalyst, it is nevertheless assured that the resin will contact catalyst before exiting the mixer tube 68. Another purpose of the different pitches of channels 88, 90 is to provide for a flow division and mixing at every point of intersection of the two pitches. Mixing is accomplished by the constant change of direction of the liquids, i.e. a circulating and linear motion combined with a flow division.

ANALOG CONTROLLER AND SYSTEM OPERATION

As described above, the resin flow path and catalyst flow path are interconnected such that the catalyst pressure "tracks" i.e. is directly responsive to, the resin pressure. This is achieved by the differential pressure regulator 40 which controls the pressure at which the catalyst is supplied to catalyst flow meter 52 as a function of the pressure sensed within the resin feed line 27. While control of the catalyst pressure based on resin pressure is helpful in providing an adjustment of the desired resin-to-catalyst ratio, even at high ratios and low resin flow, primary control of the resin-to-catalyst ratio is provided by the analog controller 16 during operation of apparatus 10. The elements of analog controller 16 are first described below, followed by a description of a set-up or system calibration procedure, and then a normal operational sequence.

With reference to FIG. 1, a first line 94 is connected between the resin flow meter 26 and a ratio comparator 96, and a second line 98 is connected between the catalyst flow meter 52 and the ratio comparator 96. Lines 94 and 98 transmit outputs representative of the actual flow of resin from resin flow meter 26 and the actual flow of catalyst from catalyst flow meter 52, respectively. A third line 100 provides an input to ratio comparator 96 from a block 102 which is representative of the desired ratio of resin flow to catalyst flow. The ratio comparator 96 is effective to compare the desired ratio of resin-to-catalyst flow with the actual flow ratio, and produce an output represented by line 104 to an integrator 106. The output of ratio comparator 96 is also input by a line 108 to an alarm, depicted by box 109 in FIG. 1, which provides a visual or audio indication of a problem situation, i.e. wherein the difference between the desired and actual resin-to-catalyst ratio exceeds a predetermined level or percentage. One suitable ratio comparator 96 is available from the AW Company of Racine, Wisc. under Model No. EMO-600.

The integrator 106 is operative to take the integral of the signal input from ratio comparator 96 over a selected time period and produce an output "E" which is representative of the error or difference between the desired and actual resin-to-catalyst ratio. This error signal E is then input through line 110 to a multiplier 112.

A line 114 interconnects the resin flow meter 26 with a frequency-to-voltage converter depicted schematically by block 116 in FIG. 1. The converter 116 converts the output from resin flow meter 26 to a voltage signal "R" which is representative of the resin flow within resin feed line 27. The voltage output R from converter 116 is input through line 118 to a potentiometer 120 of any commercially available type. The potentiometer 120 multiplies the voltage signal R by a gain factor G, the purpose of which is described below. The resulting output from potentiometer 120, R times G, is then input through line 122 to the multiplier 112. The multiplier 1.12, in turn, produces an output which is the product of the error signal (E) from integrator 106 and the output (R.G) from potentiometer 120. This output (E.R.G) from multiplier 112 is input through line 124 to a valve driver circuit 126 of the type sold by Nordson Corporation of Westlake, Ohio under Model No. FET-4. The driver circuit 126 combines the output from multiplier 112 (E.R.G) with an offset value "C", which is input through line 127 from a potentiometer 128. The magnitude of this offset value C is determined during the system calibration procedure described below. The output of driver circuit 126, represented by the factor T described below, is then input to the solenoid valve 58 through line 130 to control the duty cycle thereof, i.e. the time during which the solenoid valve 58 is opened and closed.

Having described the general construction of the analog controller 16, the initial set-up procedure for apparatus 10 can be discussed. The purpose of the initial set-up or calibration procedure is to provide an adjustment of the "on-time" T of solenoid valve 58 in order to account for the fluid properties of a particular resin and catalyst to be dispensed, and to compensate for the time it takes the solenoid valve 58 to open and close after receiving a signal from the driver circuit 126. It was recognized that in order to get an accurate ratio of resin-to-catalyst for all spraying conditions of apparatus 10, i.e. wherein different numbers of dispensers 12 are actuated at different times, an offset or time correction factor must be determined in a pre-operation, set-up procedure to properly control the open or on time of the solenoid valve 58.

Figure 3:
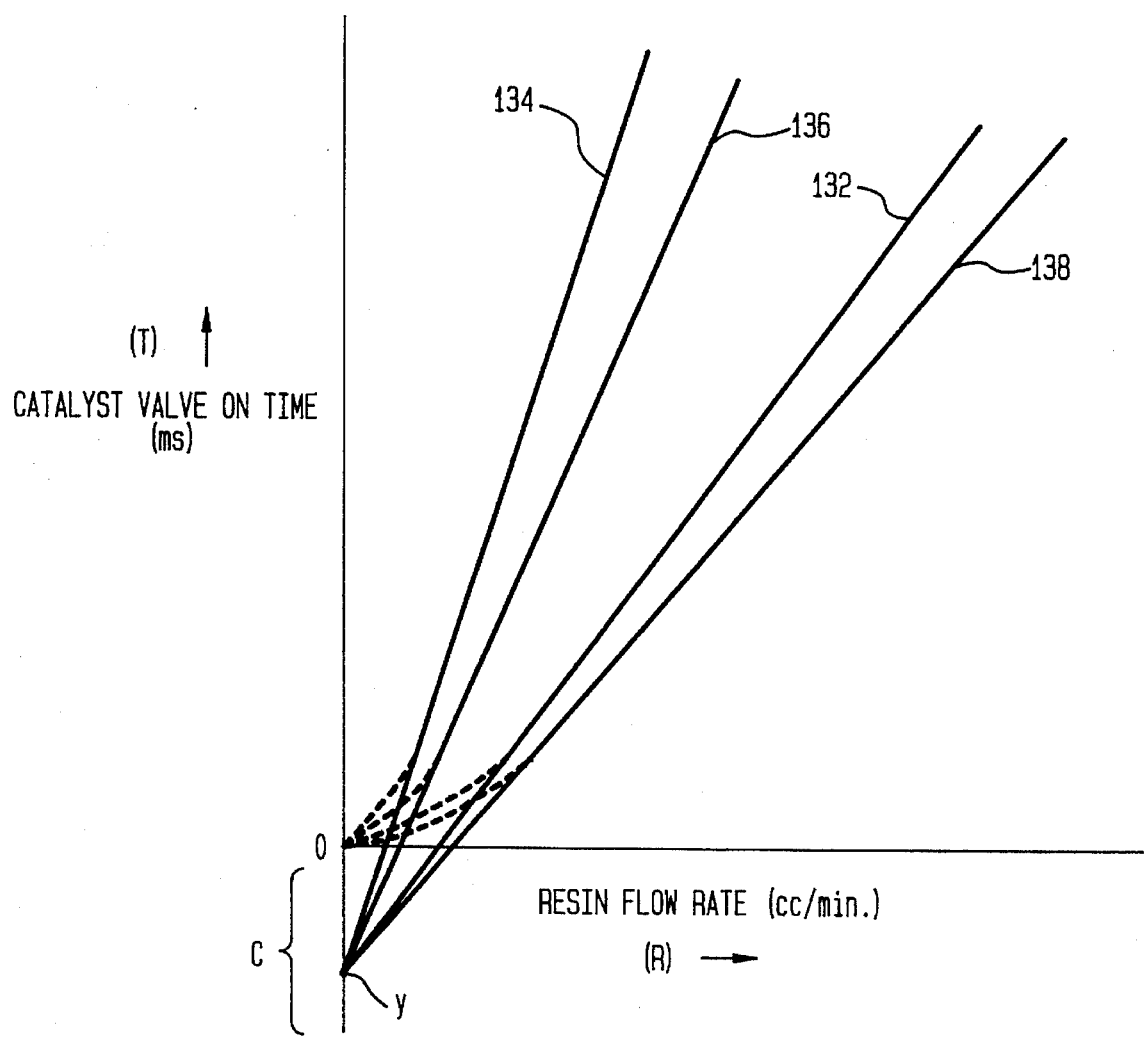
FIG. 3 is a graph of catalyst valve on time vs. resin flow obtained during the initial set-up operation of the apparatus of FIG. 1.

With reference to FIG. 3, a graph is depicted whose ordinate represents catalyst valve "on time" (T), and whose abscissa represents resin flow (R). The calibration procedure described below produces the family of curves shown on the graph, all of which intersect at a point Y below the origin of the ordinate and abscissa. The point Y is representative of a time period correction factor "C" which is input to the driver circuit 126 in order to produce the output 130 which controls the duty cycle of solenoid valve 58. The various curves depicted on the graph of FIG. 3 are all of the standard polynomial form, y= mx+b, and are derived from the following formula:

$$T=(E)(R)(G)-C \quad (1)$$

Where:

T= Catalyst or solenoid valve 58 on time

E= Error signal or difference between desired and actual resin-to-catalyst flow

R= Resin flow

G= Gain

C= Offset or time correction factor

The set-up or calibration procedure is begun by the operator initiating the lowest flow condition of apparatus 10, i.e. one of the coating dispensers 12 is turned on resulting in a flow of resin through resin feed line 27, and a flow of catalyst through catalyst supply line 50. The operator then adjusts the potentiometer 128 so that the "C" value, or time delay, is in the range of about 15 to 20 milliseconds (ms.). This initial "C" value is chosen because the solenoid valve 58 cycles in 100 ms., e.g. at an operating frequency of 10 Hz, and it has been found that it takes on the order of about 10 to 20 ms. for the solenoid valve 58 to completely open and obtain a stable flow of catalyst therethrough. It is contemplated that a different initial "C" value would be chosen for other solenoid valves having a different cycle time, so long as such C value is at least sufficient in duration to allow the solenoid valve to stabilize.

The operator next manually adjusts the orifice (not shown) of needle valve 60 until such time as the desired ratio of resin-to-catalyst is read on the ratio comparator 96. As noted above, the ratio comparator 96 is connected to both the resin flow meter 26 and catalyst flow meter 52, and it is operative to produce a visual read-out of the actual ratio of the flow of resin-to-catalyst. Assuming a 50:1 ratio is desired, for example, manipulation of the needle valve 60 continues until a 50:1 reading is obtained on the ratio comparator 96. At that time, a second dispenser 12 is turned on by the operator. This produces a different set of flow conditions for both the resin and catalyst, but the same ratio of resin-to-catalyst must be maintained. In order to maintain the same ratio, the operator adjusts the gain value "G" by manipulating potentiometer 120 until such time as the reading from the ratio comparator 96 is 50:1.

The gain value "G" is a voltage which is indicative of the slope of the lines on the graph of FIG. 3, i.e. the higher the gain, the steeper the slope and vice versa. Because the gain G affects the C value for a constant valve 58 on-time T, as reflected in Equation (1) above, adjustment of the gain via potentiometer 120 may produce a line on the graph of FIG. 3 which does not intersect the initial estimated value C set by potentiometer 128. In order to obtain the actual C value, the operator shuts off the second dispenser 12, allowing the first dispenser 12 to continue spraying, and reads the actual ratio of resin-to-catalyst from the ratio comparator 96. If the reading is not 50:1, in this example, the operator adjusts the C value by manipulating potentiometer 128 until a 50:1 reading is obtained. As a precaution, to ensure that the correct C value has now been set, the operator may again turn on the second dispenser 12 to make sure the ratio of resin-to-catalyst remains at 50:1 with the adjusted settings of potentiometers 126 and 128.

The objective of this set-up or calibration procedure is therefore to obtain a straight-line relationship between solenoid valve 58 "on" time and resin flow, at a given resin-to-catalyst ratio, regardless of whether one, two or more dispensers 12 are operating. Because of inherent delays created by the fluid properties of the resin and catalyst, and the time required for the solenoid valve 58 to open after it receives a signal from driver circuit 126 and produce a stabilized flow therethrough, a system time delay correction or offset C must be factored into the driver circuit 126 operation which is graphically represented by a negative value C on the ordinate of the graph in FIG. 3. Assuming line 132 on the graph of FIG. 3 represents a resin-to-catalyst ratio of 50:1, the lines 134 and 136 having a steeper slope are representative of lower resin-to-catalyst ratios (49:1 or less) and the line 138 having a flatter slope is representative of higher resin-to-catalyst ratios (51:1 or greater). It is noted that each of these other lines 134, 136 and 138 also pass through the point Y on the graph, and, therefore, such lines can be generated by maintaining the settings of potentiometer 120 (gain G) and potentiometer 128 (time C) obtained during the set-up procedure, and manipulating the needle valve 60. Such manipulation of valve 60 merely changes the ratio of resin-to-catalyst, and, hence, the slope of such lines 134, 136 and 138.

The dotted lines depicted in FIG. 3 are representative of the actual relationship between valve-on time and resin flow for the apparatus 10, for each of these resin-to-catalyst ratios depicted by lines 132, 134, 136 and 138, during approximately the first 10 ms. after the solenoid valve 58 has received a signal from driver circuit 126 to open. After about 10 ms., flow through the solenoid valve 58 has stabilized to a constant ratio, and it is assumed that a straight-line relationship between valve-on time and resin flow is present thereafter.

Once the apparatus 10 is calibrated in the manner described above, normal operation proceeds with essentially no further manual adjustment required. In response to actuation of one or more coating dispensers 12, resin from the resin source 18 is transmitted through resin supply line 24 and the remainder of the resin flow path described above to the mixer 14. The analog controller 16 is effective to provide two control functions involving the duty cycle of catalyst or solenoid valve 58,. i.e. (1) an essentially immediate opening of the solenoid valve 58 when one or more dispensers 12 are operated, and, (2) a periodic, relatively "slow" adjustment of the duty cycle of solenoid valve 58 dependent on the error signal E generated as described above. Because the resin flow meter 26 is connected by line 114 to analog controller 16, a signal representative of resin flow therethrough is transmitted to controller 16 immediately upon movement of the gears 28, 30 therein, i.e. as soon as resin flows through flow meter 26 in response to opening of one or more dispenser 12. This signal is processed by frequency-to-voltage convertor 116, potentiometer 120, multiplier/divider 112 and driver circuit 126 to produce an essentially instantaneous signal through line 130 which opens solenoid valve 58. An accurate, directly proportionate amount of catalyst is allowed to flow through solenoid valve 58 because the values G and C have been properly set during the calibration procedure described above. As a result, the volume of resin and catalyst transmitted to mixer 14 is accurately controlled and there is essentially no delay in obtaining the appropriate relative proportions of such components for transmission to the dispensers 12.

A second function of analog controller 16 is to periodically adjust the duty cycle of solenoid valve 58 while the apparatus 10 is operating dependent upon a comparison between the actual ratio of the catalyst to resin flow rates and the desired ratio. In the event the actual ratio varies from the desired ratio as determined within the ratio comparator 96, an error signal E is produced by integrator 106 and multiplied within the multiplier 112 with the product of resin flow rate R and gain G output from the potentiometer 120 as described above. The output from multiplier 112 is the input to driver circuit 126 where it is combined with the output from potentiometer 128, i.e. the "C" value or time delay correction determined during the calibration procedure. The driver circuit 126 essentially subtracts the value C from the input from multiplier 112 (E.R.G), in accordance with Equation (1) above, to produce an output T which is representative of the "on" time required of the solenoid valve 58 in order to introduce the proper volume of catalyst to mixer 14. Depending upon the sensed error, the solenoid valve 58 is either opened for a shorter or longer time period, thus controlling the volume of catalyst supplied to the mixer 14. The resin and catalyst are intermixed within the mixer 14, which, as described above, is constructed to allow for some degree of "catch up" or faster movement of catalyst and/or resin therethrough, so that the resin comes into contact with catalyst prior to transmission to the coating dispensers 12. This periodic adjustment of the "on-time" T occurs over relatively long intervals, i.e. on the order of about ten seconds, depending upon the setting of ratio comparator 96. Accordingly, such adjustment is essentially a minor correction or "trim" of the solenoid valve 58 duty cycle, which is otherwise governed by the signal from the resin flow meter 26 as described above.

An additional, more rapid adjustment of catalyst flow is obtained in response to fluctuations in pressure within the resin flow path. As described above, the pressure at which the resin is delivered through resin feed line 27 is sensed by the diaphragm seal 44. This pressure level is input to the differential pressure regulator 40 within catalyst supply line 50. The differential pressure regulator 40 emits the catalyst at a predetermined, proportionate pressure level to the catalyst flow meter 52 which, in turn, provides a metered flow of catalyst to the solenoid valve 58. Accordingly, the catalyst flow is rapidly and accurately adjusted in accordance with pressure variations to "fine tune" the resin-to-catalyst ratio obtained by operation of the analog controller 16.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all the embodiments falling within the scope of the appended claims.

We claim:

1. Apparatus for controlling the relative proportion of a first component and a second component within a mixture, comprising:

a mixer within which the first and second components are combined to form a mixture;

a first-supply which transmits the first component at a first pressure and a first flow rate to said mixer, said first supply producing a flow rate signal representative of said first flow rate;

a pressure sensing device operative to sense said first pressure at which the first component is transmitted to said mixer, and to produce a pressure signal representative of said first pressure;

a second supply which transmits a flow of the second component at a second flow rate to said mixer, said second supply including a pressure adjustment device which is effective to adjust the pressure of the second component supplied to said mixer in response to receipt of said pressure signal from said pressure sensing device;

a valve device, connected between said second supply and said mixer, for turning on and off the flow of the second component to said mixer in accordance with a timed duty cycle;

a controller operative to control the operation of said valve device in response to receipt of said flow rate signal from said first supply.

2. The apparatus of claim 1 in which said controller comprises electrical circuitry operative to process said flow rate signal representative of said first flow rate, and to produce an output which controls said duty cycle of said valve device.

3. The apparatus of claim 1 in which said first supply includes a first flow meter which is operative to transmit a metered quantity of the first component to said mixer.

4. The apparatus of claim 3 in which said second supply comprises:

a second flow meter connected to said valve device;

said pressure adjustment device including a differential pressure regulator operative to control the pressure at which the second component is supplied to said second flow meter dependent on said pressure signal from said pressure sensing device.

5. The apparatus of claim 4 in which said controller comprises electrical circuitry including:

first circuit elements, connected to each of said first and second flow meters, which are effective to compare the actual ratio of said first flow rate to said second flow rate with a desired ratio, and to produce an error signal representative of the difference between said actual ratio and said desired ratio;

second circuit elements which are effective to adjust the duty cycle of said valve device dependent on said error signal.

6. Apparatus for controlling the relative proportion of a first component and a second component within a mixture, comprising:

a mixer within which the first and second components are combined to form a mixture;

a first supply which transmits the first component at a first pressure and a first flow rate to said mixer, said first supply producing a flow rate signal representative of said first flow rate;

a pressure sensing device operative to sense said first pressure at which the first component is transmitted to said mixer, and to produce a pressure signal representative of said first pressure;

a second supply which transmits a flow of the second component at a second flow rate to said mixer, said second supply including a pressure adjustment device which is effective to adjust the pressure of the second component supplied to said mixer in response to receipt of said pressure signal from said pressure sensing device;

a valve device, connected between said second supply and said mixer, for turning on and off the flow of the second component to said mixer in accordance with a timed duty cycle;

a controller connected to said first supply, to said second supply and to said valve device, said controller including electrical circuitry comprising:

(i) first circuit elements which are effective to compare the actual ratio of said first flow rate to said second flow rate with a desired ratio, and to produce an error signal representative of the difference between said actual ratio and said desired ratio; and (ii) second circuit elements which are effective to adjust said duty cycle of said valve device dependent on said error signal.

* * * * *